L. BAILEY.
Hardening the Blades of Squares.
No. 157,566. Patented Dec. 8, 1874.
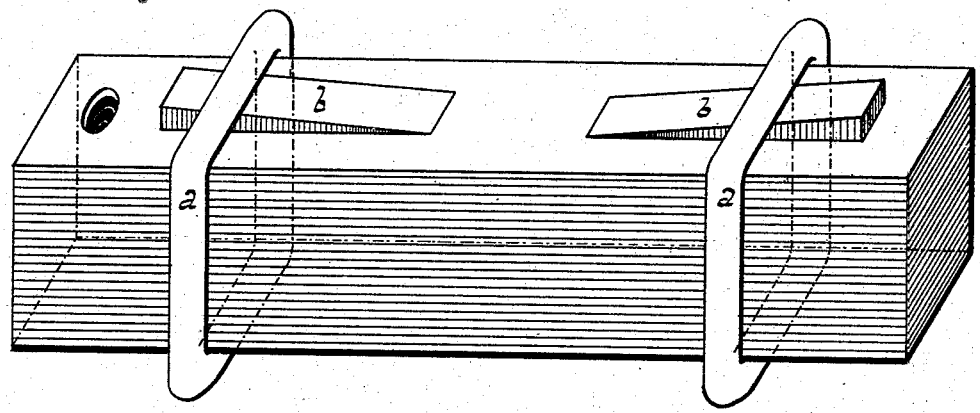
Witnesses
E. Horton
Geo. G. Sumner.
Inventor.
Leonard Bailey
By W. E. Simonds
Atty

UNITED STATES PATENT OFFICE.

LEONARD BAILEY, OF NEW BRITAIN, CONNECTICUT.

IMPROVEMENT IN HARDENING THE BLADES OF SQUARES.

Specification forming part of Letters Patent No. 157,566, dated December 8, 1874; application filed October 14, 1874.

*To all whom it may concern:*

Be it known that I, LEONARD BAILEY, of New Britain, in the county of Hartford and State of Connecticut, have invented a new and useful Improvement in the Art of Hardening the Blades of Squares, of which the following is a specification, reference being had to the accompanying drawing.

It is essential that the blades for try-squares, and other squares which are made of steel, should be flat and true on the sides. It is very desirable that the edges of these blades be hardened or tempered, but it will not do to attempt the hardening of the blade by the common method—that is, to heat it to red heat and then plunge into a bath of water or other hardening fluid—for such process will twist and spring the blade out of shape. My invention is a process whereby the edges of the blades are hardened, leaving the center of the blades soft, without twisting or springing the blades in the least.

The process is a very simple one: The blades are bunched together side by side, as shown in the drawing, and held together thus bunched in some appropriate manner, as by the hoops *a a*, wedges *b b* being used to tighten the whole together. The whole bunch or fagot is then heated to a red heat, or above, and plunged into the water or other bath. The result is that, with the exception of the two outer blades, all the blades are hardened along the edges only. The two outer blades can be put within the fagot the next time, and will come out hardened at the edges only.

By this process I not only attain the hardening of the edges without injury to the form or truth of the blade, but I can harden a large number of blades at once, it being my present practice to include twenty-two try-square blades and more in one fagot. This process is applicable to other uses than hardening blades for squares only.

I claim as my invention—

The process herein described for hardening the edges of steel plates, the same consisting in collecting the blades into a bunch or fagot, then heating the bunch or fagot to a red heat, or above, and then suddenly cooling the fagot in a water or other bath, as described.

LEONARD BAILEY.

Witnesses:
   WM. E. SIMONDS,
   S. J. SIMONDS.